United States Patent [19]

LaRocca

[11] Patent Number: 4,862,021
[45] Date of Patent: Aug. 29, 1989

[54] EXPLOSIVELY DRIVEN POWER SUPPLY

[76] Inventor: Edward W. LaRocca, 115 San Luis Way, Placentia, Calif. 92670

[21] Appl. No.: 131,079

[22] Filed: Dec. 10, 1987

[51] Int. Cl.4 .......................... H02K 1/00; G21B 1/00; G01R 33/02
[52] U.S. Cl. .......................................... 310/10; 310/14
[58] Field of Search ...................... 336/20; 310/10, 13, 310/14, 23

[56] References Cited

U.S. PATENT DOCUMENTS

| | | | |
|---|---|---|---|
| H148 | 11/1986 | Thompson | 310/10 |
| 1,544,010 | 6/1925 | Jordan . | |
| 1,785,643 | 12/1930 | Noack et al. . | |
| 2,544,077 | 3/1951 | Gardner | 171/209 |
| 2,655,867 | 10/1953 | Jordan | 102/70.2 |
| 2,813,988 | 11/1957 | Griffin et al. | 310/10 |
| 2,825,863 | 3/1958 | Krupen | 320/1 |
| 3,105,153 | 9/1963 | James, Jr. | 290/1 |
| 3,206,609 | 9/1965 | Dawes | 290/1 |
| 3,234,395 | 2/1966 | Colgate | 290/1 |
| 3,247,406 | 4/1966 | Toesca | 310/15 |
| 3,257,905 | 6/1966 | Weisman et al. | 89/1 |
| 3,337,760 | 8/1967 | Allport | 310/13 |
| 3,356,869 | 12/1967 | Hilton et al. | 310/10 |
| 3,465,161 | 9/1969 | Cutkosky | 290/1 |
| 3,484,627 | 12/1969 | Conger et al. | 310/10 |
| 3,500,078 | 3/1970 | Buser et al. | 310/13 |
| 3,522,459 | 8/1970 | Stubbs et al. | 310/10 |
| 3,564,305 | 2/1971 | Cummings et al. | 310/10 |
| 3,636,390 | 1/1972 | Stauder et al. | 310/14 |
| 4,154,200 | 5/1979 | Jarret et al. | 123/46 R |
| 4,370,576 | 1/1983 | Foster et al. | 336/20 |
| 4,376,901 | 3/1983 | Pettibone et al. | 310/10 |
| 4,403,153 | 9/1983 | Vallon | 290/1 R |
| 4,433,279 | 2/1984 | Bhate | 310/14 |
| 4,511,805 | 4/1985 | Boy-Marcotte et al. | 290/2 |
| 4,594,521 | 6/1986 | Schlicher | 310/15 |

OTHER PUBLICATIONS

Caird et al., "A Survey of Recent Work . . . Generators", 12/8/78, 2nd Int. Conf., vol. 2, pp. 1-18, Venice Italy; Abst.

Primary Examiner—Nelson Moskowitz
Attorney, Agent, or Firm—Larry Maxham; Leo R. Carroll

[57] ABSTRACT

A permanent magnet made of a pulverizable magnetic material is positioned immediately adjacent to a quantity of an explosive. An electrically conductive coil surrounds the permanent magnet and the explosive. A detonator is provided for detonating the explosive. The explosive is capable, upon detonation, of rapidly removing the magnet from inside the coil by disintegration, by collapsing the magnet or by causing high velocity omni-directional dispersal of a plurality of minute fractional parts of the permanent magnet. A single-pulse high voltage electrical signal is thereby induced in the coil.

18 Claims, 2 Drawing Sheets

EXPLOSIVELY DRIVEN POWER SUPPLY

BACKGROUND OF THE INVENTION

The present invention relates to electrical power supplies, and more particularly, to a power supply in which the explosive removal of a permanent magnet from a coil produces a single-pulse, high voltage signal.

There are many commercial and military applications which require a brief, single-pulse, high voltage electrical signal under circumstances where connection to a utility power grid is either impossible or undesirable. For example, under battlefield conditions such a signal may be required to trigger a high power microwave pulse. Batteries and other conventional portable power supplies are not viable alternatives because they are too bulky and/or expensive.

The following U.S. Patents were uncovered in a patentability search conducted in regard to my invention.

U.S. Pat. No. 2,544,077 of Gardner discloses a so-called "surge generator" in which a gun fires a projectile 6 through magnetizable barrel sections 3 and 4 separated by a gap 5 surrounded by a coil 8. The gap 5 is spanned or bridged by a permanent magnet 7. When the projectile reaches the gap, it short circuits the magnetic lines of force from the magnet through the gap, inducing a voltage in the coil, thereby lighting a gas discharge lamp 22. As the projectile leaves the gap, it induces a voltage of opposite polarity in the coil, again lighting the lamp. The apparatus is reusable.

U.S. Pat. No. 2,825,863 of Krupen discloses another system in which a permanent magnet 8 is moved a short distance by detonation of an explosive primer to induce an electrical charge in a coil 6 which is stored in a capacitor 37.

U.S. Pat. No. 3,257,905 of Weisman et al. discloses a coil apparatus removably connectable to the end of the barrel of an M-1 rifle. A permanent magnet body 24, positioned at one end of the coil apparatus adjacent the tip of the barrel, is driven through the coil at a velocity of 180 feet per second by firing a blank cartridge in the rifle. The coil apparatus is reloadable with additional magnetic bodies 24. It can generate an output signal of 56 volts and 30 amperes using a magnetic body measuring three inches in length by three-quarters of an inch in diameter, weighing 0.3 pounds and having a field strength of 10,500 gauss.

U.S. Pat. No. 3,337,760 of Allport discloses a generator in which a solid rocket motor 19 or a rifle cartridge 181/182 are used to propel a metal slug 18 or 181 down a casing 20 through a transverse magnetic field provided by electromagnets, permanent magnets or solenoid coils. The slug may be a one centimeter cube of copper which may travel at a velocity of 1,000 meters per second through a magnetic field of 10,000 gauss to thereby produce a signal of ten volts at three million amperes. Conductors 13 and 14 are provided with terminals 15 and 16 for tapping the power when the cube connects the terminals by passing therebetween at high velocity.

U.S. Pat. No. 3,500,078 of Buser et al. discloses a pulse generator in which a strong magnetic field generated by a superconducting magnet requiring cryogenic fluids is interrupted by explosively driving a coil or other electrically conductive member past the field. A shell 52 is loaded in the barrel 42 of a breech loaded gun 50. Detonation of the shell sends coil 20 and piston 40 down rails 38 and 39 through the magnetic field emanating from superconducting coil 14 adjacent to the rails. Column 4, lines 45 et seq. indicate that the transfer of large current pulses from the fast moving load coil 20 to a stationary load "sometimes proves mechanically awkward." Velocities, signal voltages and currents are not specified.

U.S. Pat. No. 3,636,390 of Stauder et al. discloses a pulse generator in which an explosive charge 18 yields a large gas volume that causes a magnetic member 28 to move within a housing 10 past coils 24. Velocities, signal voltages and currents are not specified.

U.S. Pat. No. 4,594,521 of Schlicher discloses a repeatable electric pulse generator in which explosive propellants drive a permanent magnet attached to a piston rod inside a barrel. The magnet is disposed between the poles of a magnetic circuit in a slot of a ferromagnetic core and is ejected from the magnetic circuit. A signal is generated in a coil coupled in the magnetic circuit. The magnet and piston are restored to their initial positions by a reset spring and pneudraulic {sic} device. Velocities, voltages and currents are not specified.

U.S. Pat. No. 2,655,867 of Jordan discloses a quick-acting fuse of the inertia type employed in an ordnance missile to cause instantaneous detonation on impact. On discharge of the projectile, magnet 31 moves rearwardly inducing a voltage in coil 28 which is stored in condenser 41. On impact, the condenser instantaneously discharges through firing squib 42 and causes rapid detonation of the explosive charge.

U.S. Pat. No. 1,544,010 of Jordan discloses an apparatus for inducing currents via relatively slow back and forth displacement of a piston within a cylinder via a valving system which controls expansion of refrigeration gases. An exciting current from a utility line or a battery is utilized in conjunction with field windings and a soft iron member.

U.S. Pat. No. 3,105,153 of James, Jr. discloses a air-fuel mixture free-piston engine which continuously generates an alternating current. The piston has ring-shaped permanent magnets and the cylinder has surrounding coil windings 48 in which the alternating current signals are induced.

U.S. Pat. No. 1,785,643 of Noack et al. discloses another continuously driven free-piston type gasoline engine powered electrical generating system.

U.S. Pat. No. 3,206,609 of Dawes discloses another reciprocating engine driven electrical generator. Again the piston carries a magnet and a coil surrounds the cylinder.

U.S. Pat. No. 3,234,395 of Colgate discloses another electrical generating system driven by a free-piston engine fed with a fuel-air mixture that is ignited. Magnetic elements carried by the opposing pistons are moved back and forth through coils surrounding the common cylinder.

U.S. Pat. No. 3,247,40 of Toesca discloses yet another electrical generating system that uses a free-piston engine that burns a fuel-air mixture. An external voltage is required to activate the electromagnets that are employed.

U.S. Pat. No. 3,465,161 of Cutkosky discloses another generator using a reciprocating internal combustion engine and electromagnets.

U.S. Pat. No. 4,154,200 of Jarret et al. discloses another fuel/air mixture internal combustion free-piston engine with surrounding inductor coils.

U.S. Pat. No. 4,403,153 of Vallon discloses another fuel/air mixture internal combustion free-piston engine with surrounding coils for generating electricity.

U.S. Pat. No. 4,433,279 of Bhate discloses a free piston Stirling engine/alternator power unit.

U.S. Pat. No. 4,511,805 of Boy-Marcotte et al. discloses another Stirling engine powered electric generator.

The only pertinent prior art devices described above use an explosive to drive a solid heavy magnet past a coil, or visa versa, in a single linear movement. The devices are reusable so they tend to be relatively large and expensive. The magnets and coils are heavy. Therefore, the velocities attained, and the magnitudes of the voltages generated, are unnecessarily limited.

SUMMARY OF THE INVENTION

It is therefor the primary object of the present invention to provide an improved power supply for generating a single-pulse, high voltage electrical signal.

Another object of the present invention is to provide a power supply in which the explosive removal of a permanent magnet from a coil generates a single-pulse, high voltage electrical signal.

Another object of the present invention is to provide a single use explosive power supply which is substantially destroyed during generation of a high voltage electric pulse and which is thereafter discarded.

Another object of the present invention is to provide a more compact, inexpensive, explosively driven power supply.

Another object of the present invention is to provide an explosively driven power supply capable of generating an electrical pulse of at least 200 kilovolts.

The present invention provides a power supply that has a permanent magnet made of a pulverizable magnetic material and a quantity of an explosive immediately adjacent the permanent magnet. An electrically conductive coil surrounds the permanent magnet and the explosive. A detonator is provided for detonating the explosive. The explosive is capable, upon detonation, of rapidly removing the magnet from inside the coil by disintegration, by collapsing the magnet or by causing high velocity omni-directional dispersal of a plurality of minute fractional parts of the permanent magnet. A single-pulse high voltage electrical signal is thereby induced in the coil.

DESCRIPTION OF THE PREFERRED EMBODIMENTS

Faraday has shown that an electromotive force is induced whenever the magnetic flux in a circuit is changed. One method of demonstrating this law is the removal of a permanent magnet from a coil. It will be found that a voltage will be induced across the coil while the magnet is being removed (or if the coil is moved past the magnet), and the magnitude of the induced voltage is proportional to the velocity of the moving component. Mathematically, $$\epsilon = \frac{d\phi}{dt} (N \times A)$$

$\epsilon$ = the induced voltage
$\phi$ = the magnetic flux
$N$ = the number of turns in the coil
$A$ = the area of the coil
$t$ = time For an example, if the magnetic flux is 30,000 oersteds (a measure of the strength of a permanent magnet) and the coil is 10 cms in diameter (approx. 4 inches) and consists of 100 turns, and the magnet is removed from the coil in 0.2 seconds, then the induced voltage is $$\epsilon = \frac{30,000(100 \times \pi \times 5^2)}{0.2} = 1.178 \times 10^9 \text{ab-volts},$$

which converts to 11.78 volts.

If, on the other hand, it is proposed that the removal of the magnet be accomplished by the application of an explosive charge in order to reduce the time involved (to increase the rate of flux removal) by several orders of magnitude, then the induced voltage should rise considerably. Explosive phenomena are known to occur in microseconds. For example, using a coil and magnet of the same physical characteristics of the previous example, but assuming a time of 10 microseconds, the induced voltage becomes $$\epsilon = \frac{30,000(100 \times \pi \times 5^2)}{10 \times 10^{-6}} = 2.356 \times 10^{13} \text{ab-volts},$$

which converts to 235.6 kilovolts.

It is apparent that the voltage can be increased significantly by increasing the strength of the magnet (flux), increasing the number of turns in the coil, increasing the area of the coil, and by decreasing the time for magnet removal.

Explosive removal of the flux may be accomplished in one of several ways. The magnet may be made hollow, in the form of a tube, and filled with an explosive; or, the magnet may be in the form of a rod coated with an explosive composition, and made to collapse inwardly. It may also be necessary to shock-isolate the coil to prevent damage prior to the acquisition of the induced voltage.

Figure 1:
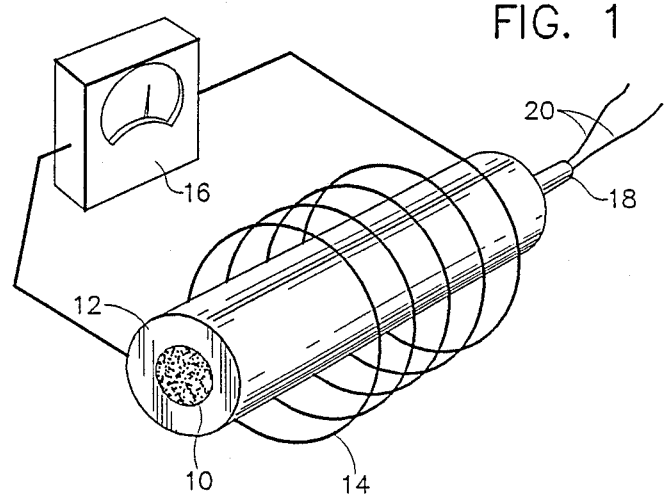
FIG. 1 illustrates a first embodiment of my invention connected to a voltmeter.

Referring to FIG. 1, a first embodiment of my invention includes a permanent magnet in the form of a cylindrical rod 10 surrounded by a cylindrically shaped quantity of explosive 12 in concentric fashion. An electrically conductive coil 14 surrounds the permanent magnet. The explosive is in intimate contact with the magnet. A voltmeter 16 may be connected across the leads of the coil a safe distance away to monitor the magnitude of the electric signal induced in the coil. Clearly the voltmeter does not form part of the invention. A detonator 18 is embedded in one end of the explosive 12 for detonating the same upon energization via electrical leads 20.

The permanent magnet 10 is preferably made of a "pulverizable" magnetic material including magnetic oxides, ceramics, or other brittle compositions. Such materials, in contrast to conventional permanent magnets made substantially of iron, will readily disintegrate into a plurality of small fractional parts when an adjacent high explosive is detonated. In my first embodiment, the surrounding explosive causes the permanent magnet to collapse inwardly. The explosive 12 is preferably extremely powerful, e.g. plastic bonded explosive.

Figure 2:
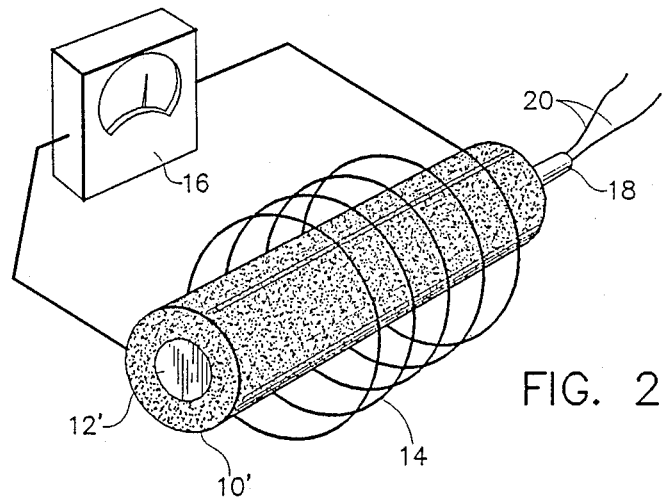
FIG. 2 illustrates a second embodiment of my invention connected to a voltmeter.

FIG. 2 illustrates a second embodiment of my invention similar to that of FIG. 1 except that in the former the explosive charge 12′ is internal and is surrounded by a tubular or cylindrical permanent magnet 10. This construction facilitates rapid high velocity dispersal of small fractional parts of the magnet from inside the coil.

The rapid removal of the magnetic flux from within the coil induces a single-pulse high voltage electrical signal in the coil. It will be understood that in the second embodiment the fractional parts disperse in an omni-directional pattern, i.e. in substantially all directions relative to the X, Y and Z axes. These permanent magnet fractional parts do not move merely in a single linear direction along the longitudinal axis of the magnetic rod 10 prior to detonation. Many of the parts have a component of motion orthogonal to the turns of the coil 14. Because the parts are preferably very small, they are driven at very high velocities, substantially higher than those that would be achieved by explosively firing the permanent magnetic rod 10 out of the coil entirely intact.

Clearly the strength of the signal induced in the coil will depend upon many factors according to the formula given above. However, because of the design, it is possible to construct a compact, relatively inexpensive device that will generate a single-pulse signal of at least 200 kilovolts.

In my invention the permanent magnet is destroyed, however, this is acceptable since the device is not intended for re-use. While the surrounding coil 12 may be destroyed, the high voltage pulse will have been induced in the coil in the instant before the destruction. Thus the generated electric signal, traveling at the speed of light will already have reached the load before the coil is destroyed.

Figure 3:
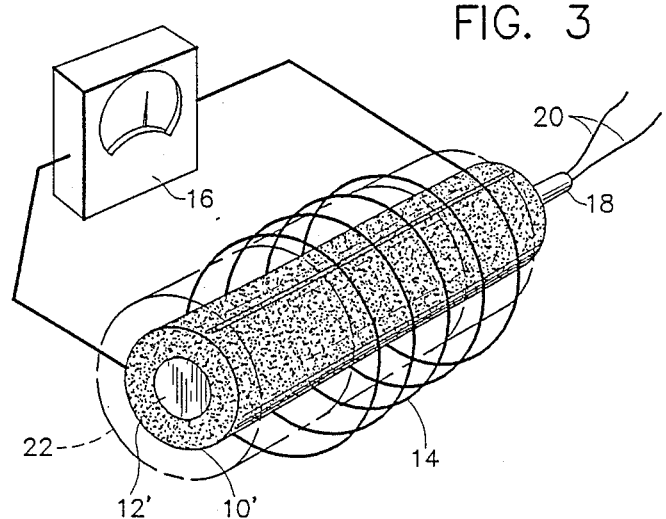
FIG. 3 illustrates a third embodiment of my invention connected to a voltmeter. A shock mitigating layer is illustrated in phantom lines.
Figure 4:
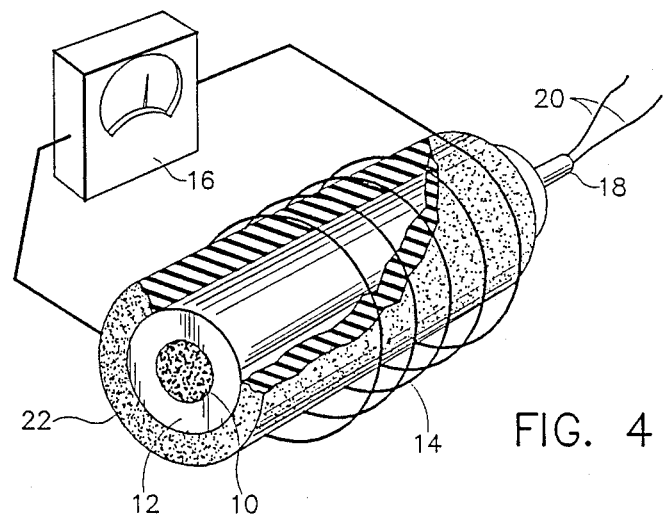
FIG. 4 illustrates a fourth embodiment of my invention connected to a voltmeter. A shock mitigating layer is illustrated with portions broken away.

A protective shock mitigating barrier may be added in the event that it is necessary to isolate the coil from the explosion to prevent damage thereof prior to acquisition of the induced electrical signal. FIGS. 3 and 4 illustrate third and fourth embodiments of my invention which are similarly to the second and first embodiments (FIGS. 2 and 1), respectively, except that a layer of a shock mitigating material 22 surrounds the concentric permanent magnet and explosive. This layer 22 is in turn surrounded by the coil. The layer 22 is illustrated in phantom lines in FIG. 3 and is shown in solid lines with portions broken away in FIG. 4. The shock mitigating layer 22 may be made of any suitable material. A wide varieties of polymers and rubbers will suffice. Where extra protection is desired, the layer 22 may be made of polyurethane foam embedded with glass bubbles.

Having described several embodiments of my explosively driven power supply, it will be apparent to those skilled in the art that my invention may be modified in both arrangement and detail. Accordingly, the protection afforded my invention should only be limited in accordance with the scope of the following claims.

I claim:

1. A power supply comprising:
   a permanent magnet made of a pulverizable magnetic material;
   a quantity of an explosive, concentric with or coaxial to the permanent magnet;
   an electrically conductive coil surrounding the permanent magnet and the explosive; and
   a detonator for detonating the explosive to remove the magnet from inside the coil by causing disintegration of the permanent magnet;
   whereby a single-pulse electrical signal will be induced in the coil.

2. A power supply according to claim 1 wherein a flux of the permanent magnet is at least 30,000 oersteds.

3. A power supply according to claim 1 wherein the explosive is capable of removing the permanent magnet from inside the coil in ten microseconds or less.

4. A power supply according to claim 1 wherein the coil has at least 100 turns of wire.

5. A power supply according to claim 1 wherein the coil has a diameter of approximately 10 centimeters.

6. A power supply according to claim 1 wherein a voltage of the electrical signal induced in the coil is at least 200 kilovolts.

7. A power supply according to claim 1 wherein the permanent magnet is surrounded by the explosive for causing the permanent magnet to collapse inwardly upon detonation of the explosive.

8. A power supply according to claim 1 wherein the permanent magnet comprises a tube with a hollow interior in which the explosive is located so that detonation of the explosive will cause high velocity omni-directional dispersal of a plurality of fractional parts of the permanent magnet.

9. A power supply according to claim 1 wherein the explosive is of the plastic bonded type.

10. A power supply according to claim 1 wherein the permanent magnet is made of a material selected from the group consisting of magnetic oxide material and ceramic material.

11. A power supply according to claim 1 and further comprising barrier means for preventing premature damage to the coil.

12. A power supply according to claim 11 wherein the barrier means comprises a layer of a shock mitigating material.

13. A power supply according to claim 12 wherein the shock mitigating material is selected from the group consisting of polymer and rubber.

14. A power supply according to claim 12 wherein the shock mitigating material is polyurethane foam embedded with glass bubbles.

15. A power supply according to claim 1 wherein the magnet surrounds the explosive.

16. A power supply accordingly to claim 7 and further comprising a layer of a shock mitigating foam material surrounding the explosive material within the coil.

17. A power supply according to claim 15 and further comprising a layer of a shock mitigating foam material surrounding the magnet within the coil.

18. A power supply according to claim 1 wherein the permanent magnet and the explosive are elongate, cylindrical and concentric.

* * * * *